March 4, 1930. C. REITER ET AL 1,749,719
ELECTRIC SOLDERING MACHINE
Original Filed Dec. 5, 1923 2 Sheets-Sheet 1
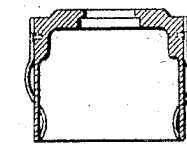
Fig.4.
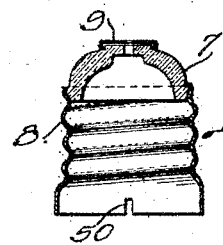
Fig.5.
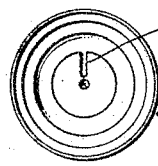
Fig.6.
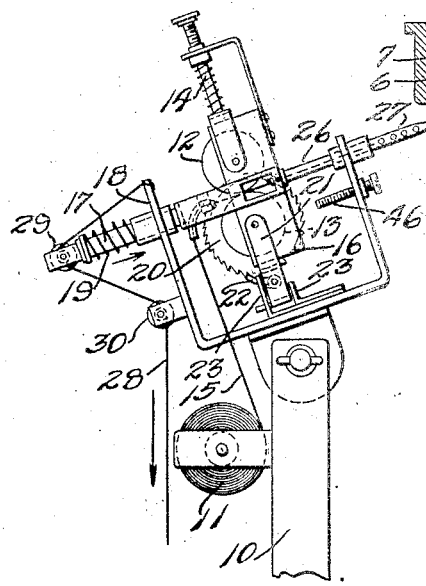
Fig.1.
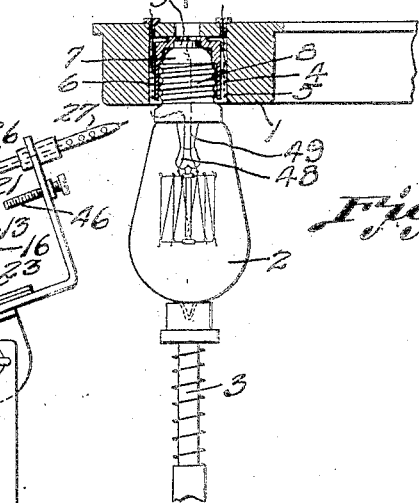
Inventors:
Caspar Reiter;
Max Stäger,
by Alexander S. ———
Their Attorney.

March 4, 1930.  C. REITER ET AL  1,749,719
ELECTRIC SOLDERING MACHINE
Original Filed Dec. 5, 1923   2 Sheets-Sheet 2
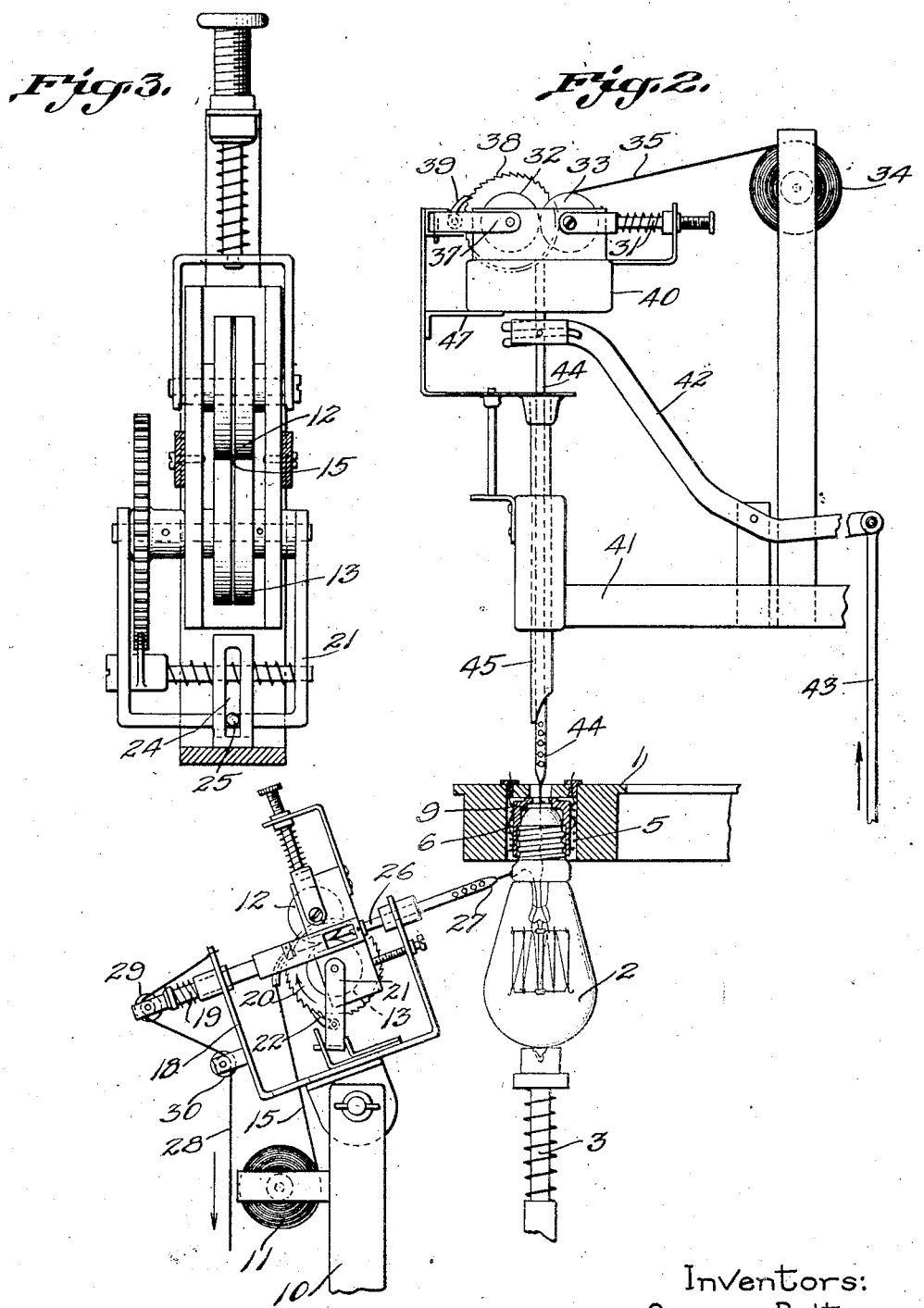
Inventors:
Caspar Reiter,
Max Stäger,
by Alexander S. Smit
Their Attorney.

Patented Mar. 4, 1930

1,749,719

UNITED STATES PATENT OFFICE

CASPAR REITER, OF BERLIN-TREPTOW, AND MAX STÄGER, OF BERLIN-BAUMSCHULEN-WEG, GERMANY, ASSIGNORS TO GENERAL ELECTRIC COMPANY, A CORPORATION OF NEW YORK

ELECTRIC SOLDERING MACHINE

Application filed December 5, 1923, Serial No. 678,756, and in Germany January 5, 1923. Renewed December 24, 1928.

Our invention relates to devices for soldering wires of electric apparatus and especially of such apparatus as electric lamps.

In the past the ends of the outer lead wires of electric lamps, which ends extend out of the base of the lamp, have been almost exclusively soldered by hand by means of small soldering irons. According to the present method and equipment, these lead wires, may be soldered to the base by a simple and entirely automatic apparatus which eliminates the use of special soldering irons and utilizes the heat which is ordinarily applied to the base of the lamp during the basing for hardening the basing cement. This heat is sufficient, as utilized by the present invention, to melt the solder placed against the base and thereby solder junctions between the wires and the base. In order that the solder placed against the base shell and against the eyelet shall be melted by the hot base, a good heat exchange between the base shell and the eyelet is necessary. This is effected, for instance, by means of a bushing of good heat conducting material which fits snugly over the base and contacts with the base eyelet thereby bridging over the insulator between the base shell and the eyelet. According to the present invention, step by step solder feed devices supply uniform quantities of wire solder at each step to the base shell and also to the base eyelet. One of these feed devices feeds the solder laterally to the base shell and the other feed device feeds the solder perpendicularly to the eyelet. The solder is controlled in each feed device by feeds rolls which are yieldingly pressed together and are turned intermittently by a ratchet mechanism. For advancing the solder the feed rolls are mounted to be operated together, either mechanically or manually by the operator through any suitable means such as a foot or hand lever.

To accomplish the foregoing and other useful ends, our invention comprises means hereinafter more fully set forth and claimed, reference being had to the accompanying drawings, in which Figs. 1 and 2 illustrate in plan view the new soldering device in two different positions; Fig. 3 shows the lateral solder feed rolls on a larger scale; Fig. 4 is a vertical cross section view through a bushing which fits over the base of the lamp and transfers heat to the eyelet, and Figs. 5 and 6 show the base of the lamp in cross section and in top view respectively.

The soldering device as illustrated is applied to a revolving basing machine in which the bases of lamps or similar devices may be cemented to the bulbs, one after another. Only a portion of the revolving spider 1, which receives and holds the lamp bases, and a spring pressed bulb pin 3, which supports the individual lamp bulb, are shown in the drawing. A metal bushing 6, Fig. 4, which may be somewhat elastic, is proportioned to cover the middle portion of the base of each lamp and fits snugly so as to be in good heat conducting relation to the covered portion while the rim or edge portion of the shell with the juxtaposed lead wire is left exposed as shown in Figs. 1 and 2. This bushing has the form of an inverted cup with a hole in the bottom and makes a heat conductive bridge across the web or insulator 7 fixed in one end of the tubular base shell 8 to carry the base eyelet 9 (see Figs. 5 and 6) set in the insulator 7 to form one terminal of the base. In the device there is provided a thermal unit or heating coil 5 for heating the bushing 6, as well as the base and the cement coating inside of the base, whereby the cement is hardened. The bushing 6 also ensures a good exchange of heat between the base shell 8 and the eyelet 9 so that the eyelet during the travel of the spider 1 of the basing machine becomes heated to substantially the same temperature as the base shell. Upon the completion of one revolution of the basing machine when the heating, and consequently the hardening of the basing cement is finished the lamp in the basing machine is in soldering position ready for the operation of the new device. This soldering device comprises two solder feed mechanisms for supplying wire solder, one arranged to feed solder laterally to the base shell and the other to feed the solder perpendicularly to the base eyelet. The lateral solder feed comprises a fixed support 10 on which a supply wheel or reel 11 of solder wire is mounted. This solder wire 15 is passed between two feed rolls 12 and 13 which rollers are pressed together by any suitable means such as the spring 14. The feed rolls 12 and 13 are provided with grooves of such size as to conveniently receive the proper size of solder wire as shown in Fig. 3, in order that the solder wire 15 may be held firmly and may be always maintained in proper position relative to the feed rolls 12 and 13. A box-like frame 16 which houses the feed rolls 12 and 13, is mounted on a slidable plunger 17 so as to be capable of being displaced longitudinally by the pin 17, which slides in a bracket 18 on the support 10. The feed rolls 12 and 13 are held ordinarily in the position shown in Fig. 1 by a spring 19. On the shaft of the lower feed roll 13 there is fastened a ratchet wheel 20 and pivotally mounted as it is a small swinging bracket 21 in which is mounted a pawl 22 which engages the ratchet wheel 20. The lower portion of the swinging bracket 21 is held by a fork 23, one prong of which has a slot 24 (see Fig. 3) for receiving the guide pin 25 of the bracket 21. Coaxial with the plunger 17 of frame 16 which houses the feed rolls 12 and 13, is a wire guide 26 fastened to the same frame and through this guide the wire solder 15 is thrust. This guide 26 moves with sufficient play in the fixed bracket 18 and is shaped, at its foremost end, into a nozzle 27 which holds the wire with some friction. A rope 28 fastened to the bracket 18 leads over a small pulley 29 on the pin 17 and over a small drum 30 on frame 18 to a foot pedal or hand lever or other similar agent, not shown.

When the pedal lever or similar member is operated to pull the rope in the direction of the arrow, the plunger 17 and therefore frame 16, which is connected with this plunger and with the feed rolls 12 and 13, as well as with the solder feed ratchet mechanism 20 and 22, is moved toward the right into the position shown in Fig. 2. The wire solder 15 which is held between the feed rolls 12 and 13, takes part in this movement whereupon some of the wire solder is wound off the supply reel 11 shown below the bracket 18. At the same time, the small swinging bracket 21, which protrudes into the fork 23 is moved as shown in Fig. 2. The pawl 22 attached to this bracket moves upward and turns the ratchet wheel 20 in the direction indicated by the arrow, each swing of the bracket producing a movement through the same distance. By this action, the feed rolls 12 and 13 are rotated and the wire solder 15, which has approached the base shell, has moved forward an additional distance. In this way, the solder is moved out of the nozzle 27 a certain constant distance for each forward movement or step of the frame 16. As this occurs, the solder is brought up against the hot base shell which is now located in the proper position. The heat of the base shell is sufficient to melt the solder and deposit a drop at the point where it strikes the base shell and builds up a solder joint at this point where the lead wire is in juxtaposition to the shell. The solder feed device above the base eyelet 9, is of similar construction. It, likewise, has two feed rolls 32 and 33 held against each other by a spring 31. The solder 35 comes off of the supply reel 34 and is passed between these feed rolls. On the shaft of the feed roll 32 is rotatably mounted a swinging bracket 37 which protrudes into the fork 36. This fork in turn is provided with a pawl 39 which engages a ratchet wheel 38 on the shaft of the feed roll 32. The box frame 40 which supports feed rolls 32 and 33, as well as the ratchet wheel mechanism, consisting of the ratchet wheel 38 and pawl 39, are moved by the lever 42 which is pivoted on the framework 41. By means of a rod 43, this lever 42 is connected to the same hand pedal, lever or other similar device which serves to move the wire solder 15 of the lateral supply. However, while the rope 28 is pulled downward, in order to move the wire solder 15 forward, the rod 43 is pushed upward in order to move the wire solder 35 downward. A nozzle-shaped wire guide 44 for the solder wire 35, is provided in a fixed bushing 45, mounted on the framework 41, during its upward and downward movements. In this case also, the wire solder is drawn from the supply reel, such as the reel 34, by the movement of the frame 40 which supports the feed rolls 32 and 33. As this occurs, the solder is moved to such an extent that it strikes the point to be soldered on the base eyelet 9 and here it melts and deposits a drop which solders the juxtaposed lead wire to the eyelet. The box frame 40 can be returned to its initial position, shown in Fig. 1, by the weight of the rod 43. However, it is also possible, if desired, to provide the upper solder feed device with a spring as in the case of the lateral solder feed device to effect the automatic upward movement of the box frame 40. The advancement of the frames 16 and 40 and consequently the advancement of the two soldering wires 15 and 35, is limited by the fixed stops 46 and 47.

In order that the soldering may be completed correctly, that is, in order that the solder will always drop off exactly on to the ends of the lead wires 48 and 49, one of the lead wires 48 is bent into the small slot 50 in the base shell, Fig. 5, while the other wire 49 is bent into a small groove or recess 51 in the base eyelet, Fig. 6, which groove has exactly the same direction as has slot 50, the leads being thus arranged before the lamps are mounted in the basing machine. Suitable marks, not shown in the drawing, are set off in the pocket 4 of spider 1, which pocket serves to receive the base. These marks enable the machine operator to always mount the lamps exactly in the right position and all that the operator has to do is to see that the slot 50 of the base shell and groove 51 of the base eyelet, line up with the fixed mark of the ring pocket.

The simultaneous advancement of the two soldering wires 15 and 35 may also be effected in some other manner. For instance, instead of guide rollers, bodily movable feed jaws can be used which ordinarily are open and become closed so as to catch the wire solder only when the solder is to be moved forward. Furthermore, the feed rolls and the ratchet mechanism can be arranged to be moved by means of one and the same automatic device instead of by means of a foot pedal or other hand device.

Besides being used for electric lamps, the invention can be applied wherever wires are to be soldered to a contact element as for instance in the case of electric discharge tubes, X-ray tubes, amplifiers, rectifiers, rheostats and the like.

While we have shown and described our invention in connection with devices of specific construction, it will be understood that we do not wish to limit ourselves to the exact form of devices shown inasmuch as, as the result of the disclosures of this specification, modifications of our invention will readily suggest themselves to those versed in this subject.

What we claim as new and desire to secure by Letters Patent of the United States, is:

1. In a soldering machine for soldering a wire to a base terminal of a device comprising a glass vessel having a base with a metal terminal, the combination of a socket for receiving the base of said device to hold it with said terminal exposed and said wire adjoining said terminal, and means associated with said socket to electrically heat said base terminal, a solder feed device for feeding unmolten solder to said heated base at said exposed junction and actuating means for actuating said feed device while said terminal is hot.

2. In a soldering machine for soldering two wires to the base terminals of a device having a base comprising a metal shell constituting one terminal and an eyelet carried by but insulated from said shell and constituting another terminal, the combination of a metal element associated with said socket to heat the shell of a base in said socket and simultaneously heat said eyelet by heat conduction through said socket, to fit snugly over said shell and engage said eyelet to leave said eyelet and a portion of said shell exposed and to thermally connect the shell and the eyelet, an electric heater and a solder feeding device for applying unmolten solder to the heated shell and eyelet for soldering said wires to said shell and to said eyelet.

3. In a soldering machine for soldering leading-in wires to the base terminals of an electric device having a base shell and a base eyelet, means for heating the shell comprising a socket for receiving the base of the device, and an electric heating element applied to said socket, a metal element for thermally connecting the shell and the eyelet to heat the eyelet, and a solder feeding device for applying unmolten solder to the shell and to the eyelet while the eyelet is hot for soldering leading-in wires to the shell and to the eyelet.

4. A soldering machine for soldering the leading-in wires to the base terminals of an electric device having a base shell and a base eyelet, means for heating the shell, and a metal element for thermally connecting the shell and the eyelet to heat the latter, and a solder feeding mechanism for applying unmolten solder simultaneously to the shell and to the eyelet for soldering a leading-in wire to the shell and for soldering a leading-in wire to the eyelet.

5. A soldering and basing machine comprising a work holder for maintaining a glass article juxtaposed to a mass of metal having in good heat conducting relation to it a layer of cement in contact with said article and capable of being hardened by heating, a heating coil mounted on said work holder to cover and to be in good heat conducting relation to a part of said mass of metal in said holder and to leave another part of said mass exposed, means for supplying current to said coil, and a solder feed device mounted adjacent said holder to feed solder into contact with the exposed part of said mass of metal.

6. In a soldering machine the combination of a socket for holding a metal shell with its middle portion covered and its edge portion exposed and in juxtaposition to a piece of metal to be soldered to it, electrical means for heating the covered portion of said shell, and a solder feed device for feeding solder into contact with the exposed portion of said shell at the junction between said shell and said piece of metal.

7. In a soldering machine, the combination of a socket for holding a metal shell with its middle portion covered and its edge portion exposed and in juxtaposition to a piece of metal to be soldered to it, a heating coil mounted in said holder to encircle and to be in good heat conducting relation to the covered portion of said shell to heat it directly by conduction from said coil and to heat said exposed portion by indirect conduction through said shell, means for supplying current to said coil, and a solder feed device for feeding solder into contact with the exposed portion of said shell at the junction between said shell and said piece of metal.

8. In a soldering machine for soldering two wires to a base comprising a tubular metal shell and an eyelet mounted on but insulated from one end of said shell, the combination of a metal cup for holding said shell with said eyelet in contact with the bottom of said cup and with said eyelet, and a portion of said shell exposed and in juxtaposition with a wire to be soldered to it, an electric heating element associated with said socket in good heat conducting relation to the unexposed portion of said shell, and a solder feed device for feeding solder into contact with said eyelet and said exposed portion of said shell.

9. In a soldering machine for soldering a wire to a base comprising a metal shell, the combination of a socket for holding said shell with a portion of said shell exposed and in juxtaposition to the wire to be soldered to it, an electric heating element associated with said holder to be in good heat conducting relation to the unexposed portion of said shell in said holder, a solder feed device for feeding solder into contact with said exposed portion of said shell and means for actuating said feed device while said shell is hot.

10. In a soldering machine for soldering a wire to the eyelet of a base comprising a tubular shell and a metal eyelet mounted on but insulated from one end of said shell, the combination of a base holder, an electric heater incorporated in said holder to heat the shell of a base in said holder, a metal conductor mounted to be in good heat conducting relation to both the shell and the eyelet of the base in said holder and thereby heat the eyelet by heat conduction while the base is in the holder, and a solder feed device for applying unmolten solder to the heated eyelet to solder a juxtaposed wire to the eyelet.

11. In a soldering machine for soldering a wire to the eyelet of a base comprising a tubular shell and a metal eyelet mounted on but insulated from one end of said shell, the combination of an electric heating coil, a base receiving socket in the form of an inverted metal cup having a hole in the bottom, and the socket being inside said coil and proportioned to fit snugly in the shell of the base with its bottom in contact with said metal eyelet to conduct heat to the eyelet, and thereby heat the eyelet while the base is in the socket, and a solder feed device for feeding unmolten solder through the hole in the bottom of said cup to the heated eyelet to solder a juxtaposed wire to the eyelet.

In witness whereof, we have hereunto set our hands this 17th day of November, 1923.

CASPAR REITER.
MAX STÄGER.